(12) United States Patent
Ayzenshtat et al.

(10) Patent No.: US 10,185,748 B1
(45) Date of Patent: Jan. 22, 2019

(54) COMBINING NATURAL LANGUAGE AND KEYWORD SEARCH QUERIES FOR PERSONAL CONTENT COLLECTIONS

(71) Applicant: Evernote Corporation, Redwood City, CA (US)

(72) Inventors: Mark Ayzenshtat, San Mateo, CA (US); Zeesha Currimbhoy, Mountain View, CA (US); Adam Walz, Sandy, UT (US)

(73) Assignee: EVERNOTE CORPORATION, Redwood City, CA (US)

( * ) Notice: Subject to any disclaimer, the term of this patent is extended or adjusted under 35 U.S.C. 154(b) by 213 days.

(21) Appl. No.: 14/446,474

(22) Filed: Jul. 30, 2014

Related U.S. Application Data

(60) Provisional application No. 61/868,745, filed on Aug. 22, 2013.

(51) Int. Cl.
*G06F 17/30* (2006.01)

(52) U.S. Cl.
CPC ...... *G06F 17/3053* (2013.01); *G06F 17/3064* (2013.01); *G06F 17/30554* (2013.01)

(58) Field of Classification Search
CPC .......... G06F 17/3064; G06F 17/30654; G06F 17/30657; G06F 17/30976; G06F 17/3043; G06F 17/3053; G06F 17/30554; G06F 17/3097; G06F 17/30967; G06F 17/30401; G06F 17/30448; G06F 17/30684; G06F 17/3084; G06F 17/271; G06F 17/276; G06F 17/2881; G10L 15/18; Y10S 707/99934; Y10S 707/99935

USPC .................. 707/767, 765, 769, 775; 704/257
See application file for complete search history.

(56) References Cited

U.S. PATENT DOCUMENTS

| | | | | |
|---|---|---|---|---|
| 6,564,213 | B1 * | 5/2003 | Ortega | G06F 17/3064 |
| 7,702,690 | B2 * | 4/2010 | Brave | G06F 17/30867 707/776 |
| 8,521,739 | B1 * | 8/2013 | Pasca | G06F 17/30867 707/736 |
| 8,694,483 | B2 * | 4/2014 | Roulland | G06F 17/30646 707/706 |
| 8,700,653 | B2 * | 4/2014 | Hansson | G06F 17/3064 707/731 |

(Continued)

*Primary Examiner* — Dennis Truong
(74) *Attorney, Agent, or Firm* — Morgan, Lewis & Bockius LLP

(57) ABSTRACT

Providing incremental search suggestions as a user enters terms in a search query includes determining if a recently entered term is in a context-free dictionary of natural language phrases, generating natural language query search completion candidates corresponding to terms provided by the user in the search query if the recently entered term is in the context free dictionary, determining if the recently entered term contains a keyword hint if the recently entered term is not in the context free dictionary, generating keyword search completion candidates if the recently entered term is at least part of a keyword hint, scoring the candidates from a current iteration and any previous iterations from previously entered terms to provide a set of possible candidates, and ordering the possible candidates based on at least the scoring. Providing incremental search suggestions may also include building compound search queries that include natural language phrases and keywords.

22 Claims, 5 Drawing Sheets

(56) References Cited

U.S. PATENT DOCUMENTS

| | | | | |
|---|---|---|---|---|
| 8,849,796 B2* | 9/2014 | Diab | .................. | G06F 17/30864 |
| | | | | 705/14.25 |
| 9,183,257 B1* | 11/2015 | Buchanan | .......... | G06F 17/30864 |
| 2003/0093276 A1* | 5/2003 | Miller | ..................... | G10L 15/22 |
| | | | | 704/257 |
| 2006/0100998 A1* | 5/2006 | Edwards | ........... | G06F 17/30654 |
| 2006/0161520 A1* | 7/2006 | Brewer | ............... | G06F 17/3064 |
| 2007/0050339 A1* | 3/2007 | Kasperski | ......... | G06F 17/30967 |
| 2007/0299824 A1* | 12/2007 | Pan | ..................... | G06F 17/2785 |
| 2008/0091670 A1* | 4/2008 | Ismalon | .............. | G06F 17/3064 |
| 2011/0025516 A1* | 2/2011 | Johnson | ............. | G06F 17/2705 |
| | | | | 340/657 |
| 2012/0117082 A1* | 5/2012 | Koperda | ............ | G06F 17/3053 |
| | | | | 707/748 |
| 2012/0117102 A1* | 5/2012 | Meyerzon | ........... | G06F 17/3064 |
| | | | | 707/767 |
| 2013/0021346 A1* | 1/2013 | Terman | .................... | G09B 5/08 |
| | | | | 345/467 |
| 2013/0073544 A1* | 3/2013 | Edwards | .......... | G06F 17/30654 |
| | | | | 707/731 |
| 2013/0144899 A1* | 6/2013 | Lee | .................. | G06F 17/30392 |
| | | | | 707/759 |
| 2014/0143268 A1* | 5/2014 | Finkelstein | ......... | G06F 17/3064 |
| | | | | 707/767 |
| 2014/0337371 A1* | 11/2014 | Li | ..................... | G06F 17/30958 |
| | | | | 707/767 |
| 2015/0012559 A1* | 1/2015 | Diab | ................. | G06F 17/30864 |
| | | | | 707/765 |
| 2015/0161271 A1* | 6/2015 | Gur | .................... | G06F 17/3087 |
| | | | | 707/728 |
| 2015/0161291 A1* | 6/2015 | Gur | ........................ | G06F 3/167 |
| | | | | 707/722 |

* cited by examiner

COMBINING NATURAL LANGUAGE AND KEYWORD SEARCH QUERIES FOR PERSONAL CONTENT COLLECTIONS

CROSS-REFERENCE TO RELATED APPLICATIONS

This application claims priority to U.S. Prov. App. No. 61/868,745, filed Aug. 22, 2013, and entitled "COMBINING NATURAL LANGUAGE AND KEYWORD SEARCH QUERIES FOR PERSONAL CONTENT COLLECTIONS," which is incorporated herein by reference.

TECHNICAL FIELD

This application relates to the fields of information management, search and presentation of personal and shared information, and more particularly to the field of combining keyword based search with natural languages search for personal content.

BACKGROUND OF THE INVENTION

According to research data, knowledge workers spend 38% of their time searching for information. A 2012 global survey of information workers and IT professionals by IDC has discovered that, on average, a knowledge worker spends about five hours per week searching for documents, and almost half of that time results in searching for documents that are not found. With the proliferation of personal content management systems, such as the Evernote Service and software developed by the Evernote Corporation of Redwood City, Calif. or Microsoft Corporation's OneNote software, search in personal, shared and corporate wide content collections is becoming a central feature of contemporary content management systems and search efficiency is considered by many a key factor defining user productivity.

Numerous flavors and directions of search techniques are quickly progressing and finding demand among individual and corporate users. This may include search in diverse types of data, such as text, images, video, audio, directly rendered and attached media, various search workflows ranging from incremental keyword search to semantic search with natural language queries, question answering in general and vertical search engines developed for specific knowledge areas, etc.

The natural language user interface is evolving as an important aspect of search engines for many audiences. Search and question answering systems, where queries may be entered as natural language phrases, have been implemented in a variety of desktop and mobile applications, such as Wolfram Alpha, generic Google Search, Facebook Graph Search, Apple Siri, Google Search for Android, etc. For example, Google search for an incomplete phrase "how many US presidents" instantly offers several natural language continuations, including suggestions such as " . . . were left handed", " . . . have we had", " . . . have there been", etc. Personal desktop applications, such as Microsoft's Windows 7 File Explorer or Microsoft Outlook 2010 (part of Microsoft Office 2010 software suite) are also supplied with basic features of a natural language interface. Thus, searching a folder "Documents" on a Windows 7 personal computer with an enabled natural language search option allows a user to instantly find files satisfying natural language queries, for example, "images last week" or "large pdf", pertaining to various types of personal content, size, creation/update time of items, and other content parameters.

Notwithstanding recent developments, applications of natural language interfaces in search through personal and shared content collections are facing significant challenges. In addition to traditional issues with natural language interfaces such as interpretations of modifications, conjunctions and disjunctions, anaphora resolution, contextual use of synonyms and associated problems of semantic search, there are specific difficulties related to limited data volume in personal and enterprise context collections, generalization of terms and choosing between keyword search and natural language search.

Systems that rely strictly on natural language interface in question answering, search and assistance may cause user dissatisfaction, which was reported for many practical applications. A recent broad survey of mobile assistants indicated that correct interpretations of natural language queries were achieved at a 70% level at best. Similar situation exists with natural search in limited content collections. In a previously discussed example of a natural language search query for "images last week", even a slight modification of the query to read "image files last week" misguides the search. Another natural language query that suggests a search for "office documents" does not work correctly at all; instead of retrieving files in standard formats of various office suites, such as Microsoft Office, as would be expected by a majority of users, the system looks for the term "office" as part of file names and does not attempt to resolve the query as a natural search predicate. In other words, a natural language search component cannot distinguish between a meta-term "office document" for search in a specific content category and a keyword "office" for search in file names and document content.

Accordingly, it is desirable to develop robust natural language interfaces for search queries in personal, shared and corporate data collections that combine advantages of incremental keyword search and natural language input.

SUMMARY OF THE INVENTION

According to the system described herein, providing incremental search suggestions as a user enters terms in a search query includes determining if a recently entered term is in a context-free dictionary of natural language phrases, generating natural language query search completion candidates corresponding to terms provided by the user in the search query if the recently entered term is in the context free dictionary, determining if the recently entered term contains a keyword hint if the recently entered term is not in the context free dictionary, generating keyword search completion candidates if the recently entered term is at least part of a keyword hint, scoring the candidates from a current iteration and any previous iterations from previously entered terms to provide a set of possible candidates, and ordering the possible candidates based on at least the scoring. Providing incremental search suggestions as a user enters terms in a search query may also include displaying a subset of the possible candidates to the user, wherein the subset corresponds to the possible candidates having a highest score interval. Scoring the candidates may be based at least partially on a non-monotonic document frequency function, where candidates that appear a first amount corresponding to a relatively frequent occurrence in a content database and candidates that appear a second amount corresponding to a relatively infrequent occurrence in the content database both score lower than candidates that appear in a content database with a frequency that is between the first amount and the second amount. The content database may be provided by the OneNote® note-taking software product. In response to the recently entered term being in the context-free dictionary and a subsequent term being in the context-free dictionary, a sub-query may be extended to form one or more natural language phrases consistent with terms that are entered. The context-free dictionary may include different categories of items, synonyms of terms, lists of synonymous names of external applications and associated data types, qualifiers and grammatical forms of terms, and/or customized terms. The different categories may include types of items in a content collection, data attributes of items, data sources for items, hardware used to obtain, store and process data for items, and temporal characteristics of the items. Customized terms may include generic terms for user locations, refined temporal terms, terms describing item size, and/or user specific content. The customized terms may be provided by a content database of the user. Providing incremental search suggestions as a user enters terms in a search query may also include building compound search queries that include natural language phrases and keywords. Building compound search queries may include detecting terms not in the context-free dictionary and/or hints. The hints may include prepositions and quotation marks.

According further to the system described herein, a non-transitory computer readable medium contains software provides incremental search suggestions as a user enters terms in a search query. The software includes executable code that determines if a recently entered term is in a context-free dictionary of natural language phrases, executable code that generates natural language query search completion candidates corresponding to terms provided by the user in the search query if the recently entered term is in the context free dictionary, executable code that determines if the recently entered term contains a keyword hint if the recently entered term is not in the context free dictionary, executable code that generates keyword search completion candidates if the recently entered term is at least part of a keyword hint, executable code that scores the candidates from a current iteration and any previous iterations from previously entered terms to provide a set of possible candidates, and executable code that orders the possible candidates based on at least the scoring. The software may also include executable code that displays a subset of the possible candidates to the user, wherein the subset corresponds to the possible candidates having a highest score interval. Scoring the candidates may be based at least partially on a non-monotonic document frequency function, where candidates that appear a first amount corresponding to a relatively frequent occurrence in a content database and candidates that appear a second amount corresponding to a relatively infrequent occurrence in the content database both score lower than candidates that appear in a content database with a frequency that is between the first amount and the second amount. The content database may be provided by the OneNote® note-taking software product. In response to the recently entered term being in the context-free dictionary and a subsequent term being in the context-free dictionary, a sub-query may be extended to form one or more natural language phrases consistent with terms that are entered. The context-free dictionary may include different categories of items, synonyms of terms, lists of synonymous names of external applications and associated data types, qualifiers and grammatical forms of terms, and/or customized terms. The different categories may include types of items in a content collection, data attributes of items, data sources for items, hardware used to obtain, store and process data for items, and temporal characteristics of the items. Customized terms may include generic terms for user locations, refined temporal terms, terms describing item size, and/or user specific content. The customized terms may be provided by a content database of the user. The software may also include executable code that builds compound search queries that include natural language phrases and keywords. Executable code that builds compound search queries may detect terms not in the context-free dictionary and/or hints. The hints may include prepositions and/or quotation marks.

The proposed system continuously parses incremental user search queries against a context free grammar that defines natural language phrases and attempts to complete user input to form well-defined phrases. Simultaneously, the proposed system evaluates user input for keywords based on a keyword index, explained elsewhere herein. Depending on relative scores of a natural language input branch and a keyword branch, the system may present to the user a natural language query, a keyword selection or a combined list of natural language query(ies) and incremental keyword search suggestions for subsequent selection and use. Depending on system settings and scores, natural language queries may be prioritized over keyword search queries and displayed on top of the list or vice versa. Additionally, the system may interpret and display compound natural language and keyword search queries by marking up a portion of terms within a natural search query that may be interpreted as keywords and entered as parameters into a natural language query.

The system processes user input in a search field or other user interface element, such as a dialog box, a file explorer, a text box, etc. Every term entered by a user is compared to the basic set of terms accepted by the natural language grammar of queries, i.e. the alphabet of the context free grammar, or the dictionary. As long as an incrementally entered set of terms belongs to the dictionary, the system may extend the sub-query entered from the start of search to form natural language phrases consistent with the grammar, which includes a limited set of syntactic production rules. The system may display one or several top scoring natural language queries.

Simultaneously, the system may proceed with a conventional incremental keyword search, calculate a score of the same sub-query interpreted as a keyword search object and generate a list of incremental search suggestions in parallel with natural input queries. For this purpose, stop words may be eliminated from the input and the remaining terms may be scored according to a generalized term frequency and document frequency metrics adapted to limited content collections, such as described in U.S. patent application Ser. No. 13/924,905 titled: "GENERATING AND RANKING INCREMENTAL SEARCH SUGGESTIONS FOR PERSONAL CONTENT", filed on Jun. 24, 2013 by Ayzenshtat, et al. and incorporated by reference herein. The system may look for appropriate incremental search suggestions in a personal content database (or a mix of personal and shared databases) containing documents, notes or other item and utilizing a periodically updated reverse index linking individual terms, n-grams and named entities to items from the content collections that include these terms, n-grams and named entities.

The system dictionary serving as an alphabet for the natural language grammar may include various categories of terms reflecting potential search needs by users of a content management system. Categories of vocabulary terms may include the following:

Types of items in a content collection, such as text notes, notes with images, documents, audio and video clips, document attachments and other components and layouts.

Data attributes such as notebooks or other collections where items belong, tags, links between items and other organizational features, encrypted data portions, etc.

Data sources for items in content collections, such as web clips, photographs, screenshots, audio recording, scanned documents, handwritten input from tablets and other sources.

Hardware used to obtain, store and process data, such as desktop and laptop computers, tablets, smartphones, digital pens, scanners, paper notebooks, such as Evernote Notebooks by Moleskine, and other devices.

Add-ons and third party application environment used to acquire, store, modify and display the content, for example, Web Clippers, Skitch and Penultimate by Evernote, Ever-Clip by Ignition Soft Ltd., etc.

Temporal characteristics, including date and time and time periods (such as recently, last month, this week, today); locations such as countries, cities, states, counties, together with general and proximity characteristics, for example, home, work, office, nearby; people (co-workers, relatives, friends); size identifiers, such as small, midsize, large; etc.

Terms in the system dictionary may be accompanied by synonyms. For example, a synonym cloud accompanying the term image may include picture, photo, photograph, portrait, shot, snapshot, pics, pix, etc. Analogously, a content item obtained through clipping of a web page may be described in a search query as web, web clip or web clipping; a mobile device serving as a data source may be recognized in a search query as a phone, mobile, device, tablet, smartphone, iPhone, iOS device, android, droid, windows phone, winphone, blackberry, etc. The dictionary may also include extensive lists of synonymous names of external applications and associated data types that may be included with content as documents or attachments; examples may include office, Microsoft office, MS office, doc, docx, PowerPoint, ppt, pptx, open office, iLife, slides, deck, pages, Keynote, Excel, xls, xlsx, spreadsheet, etc. In addition to external applications and formats, the dictionary may specifically reflect an integrated application environment for content management systems that serve as integration platforms. For example, the terms skitch, penultimate, facebook may describe integrated applications and associated data types for the Evernote content management system.

In addition to synonyms, the dictionary may include qualifiers and various grammatical forms of terms of the dictionary. For example, terms web, scanned, camera may serve as qualifiers to content sources clip, document, photo: web clip, scanned document, camera photo, whereas both grammatical forms scanner and scanned may be used interchangeably: scanner document, scanned document.

System customization may include several aspects:

Defining generic terms for user locations, such as home, work, here; refining temporal terms, such as recently, long ago, or terms describing item size, for example, large, small, etc. Incorporating user specific content, such as personal names from a company address book or office locations.

Using custom content in scoring; for example, if a particular set of terms is present in several user notes and a user enters these terms as a search sub-query, then it is more likely that a keyword search may be preferred to the natural language search and the system may present keyword search suggestions first.

The system may complete user sub-queries on the fly according to production rules in the natural language query grammar and may present users with semi-complete regular queries. For example, a user sub-query office this month may be completed as a natural language search suggestion Did you mean: notes with Microsoft office files created this month? The user may continue typing the query in which case the system may modify the completed natural language query. Thus, if the user continues the previous query as office this month home, the modified natural language query may look like Did you mean: notes with Microsoft office files created this month at home?

To build compound search queries where keyword terms are incorporated into natural language phrases, the system may look for non-dictionary terms and for hints defining keywords within sub-queries, such as prepositions, quote signs or dedicated meta-terms. Once non-dictionary terms and/or hints are identified, the system may extent a natural language query with a portion or several portions dedicated to keywords.

For example, an incremental user sub-query August notes with project X contains a preposition with, providing a hint at a possible interpretation of a combined query: notes taken in August [natural language portion] with the keywords "project X" [keyword portion].

Analogously, a query recent "spatial" documents may prompt to the natural language analysis component that the term "spatial" enclosed in quote signs might be a keyword. Correspondingly, the system may suggest a combined query recently attached documents [natural language portion] with the keyword "spatial"[keyword portion].

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for parallel processing of incremental search queries and for combining natural language queries with keyword search suggestion lists and with compound queries containing both natural language and keyword components for content management systems that may include private content collections, as well as shared and business wide collections, such as supported by the Evernote cloud service and software, developed by the Evernote Corporation of Redwood City, Calif. The system may rely upon custom and limited content in private and business owned content collections and may incorporate both generic and user specific terms and settings. Note, however, that the system may also be implemented with any personal or corporate private or semi-private content database system, such as the OneNote® note-taking software provided by the Microsoft Corporation of Redmond, Wash. A database system underlying a content management system may or may not be cloud-based.

Figure 1:
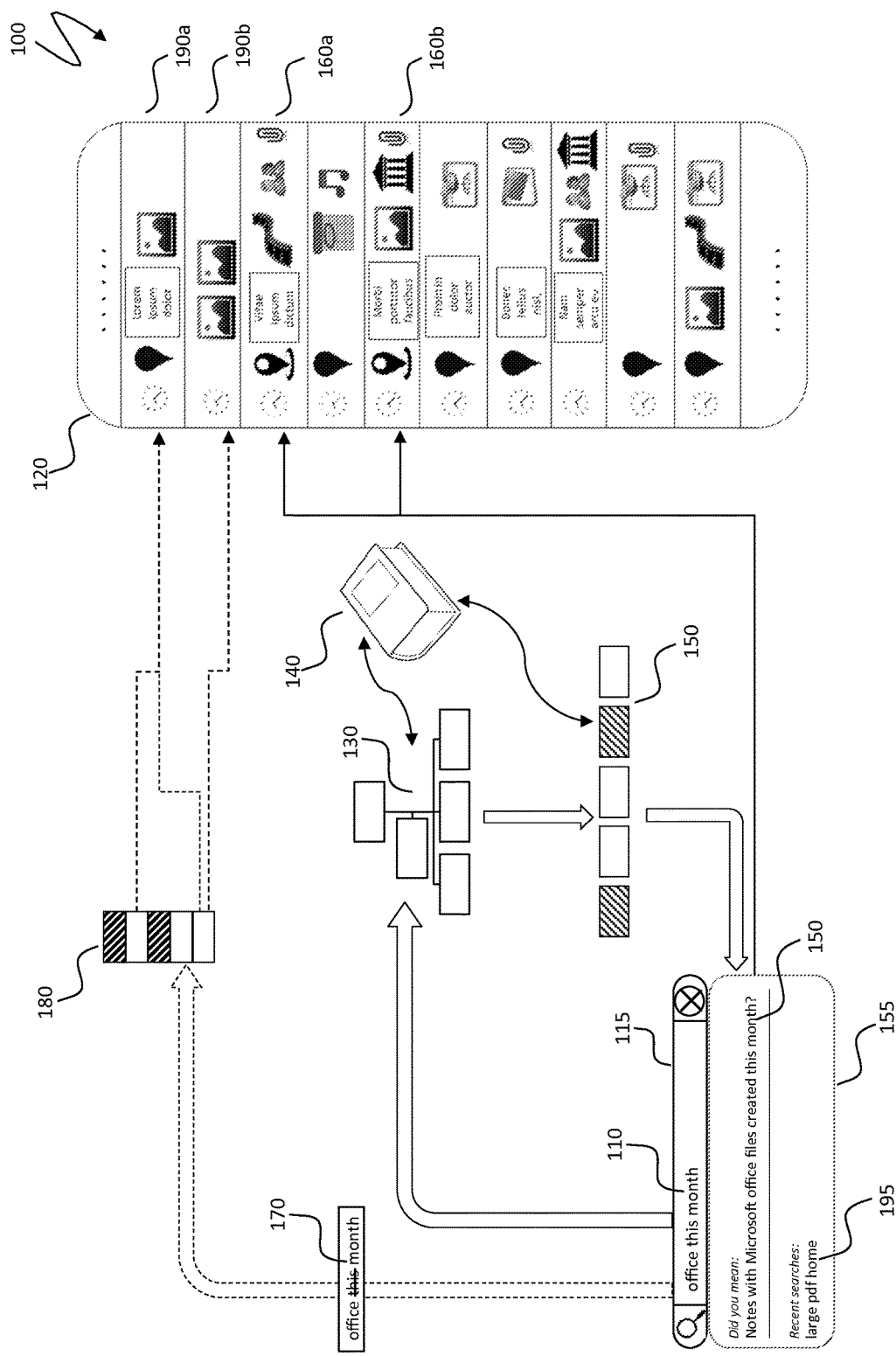
FIG. 1 is a schematic illustration of the system architecture, according to an embodiment of the system described herein.

FIG. 1 is a schematic illustration 100 of the system architecture. A partial search query 110 (a sub-query, an incremental query) is entered into a search field 115 of a content management system for search in a content collection 120.

Figure 4:
FIGS. 4A-4F are schematic illustrations of search queries and results, according to an embodiment of the system described herein.

A context free grammar (CFG) parser 130 continuously processes a partial sub-query 110 as the user adds more search terms. The parser 130 utilizes a system dictionary 140 and attempts to complete a natural search query 150 shown as a layout in the parsing chain and displayed as a natural language phrase in a search suggestion list 155. FIG. 1 shows a scenario where completion of the natural language query was successful, the natural language query built by this process has won by score and became the only suggestion on the list 155. Obviously, other scenarios are also possible, as explained elsewhere herein and illustrated, in particular, in FIGS. 2 and 4. If the natural language query is meaningful to the user and reflects the search purpose, the user may select the query, which causes the system to apply the query to the content collection 120 and deliver search results 160a, 160b to the user.

Simultaneously, the partial sub-query 110 is processed by a keyword suggestion mechanism, which is separate from the natural language query engine. For the keyword suggestion mechanism, stop words may be eliminated, as shown in an item 170. A remaining portion of the partial sub-query 110 may be subsequently processed using an incremental reverse search index 180, which is updated periodically and links each of entries, such as keywords, n-grams and named entities, to items in a content collection that include these entries. Scoring of partial search query is based on term and document frequency and is explained in the above-referenced U.S. patent application Ser. No. 13/924,905, which describes that candidates may be scored based at least partially on a non-monotonic document frequency function, where candidates that appear a first amount corresponding to a relatively frequent occurrence in a content database and candidates that appear a second amount corresponding to a relatively infrequent occurrence in the content database both score lower than candidates that appear in a content database with a frequency that is between the first amount and the second amount.

In an embodiment, keyword search results may be produced independently from incremental search suggestions and may be presented to the user in the background, as illustrated by dashed arrows retrieving additional items 190a, 190b. For example, a partial query office this month used in the illustration 100 may ultimately lead to the natural search query 150 and search results 160a, 160b, while a background keyword search may retrieve notes or documents 190a, 190b related to office meetings and other monthly projects.

Upon completion, search queries may be placed into a search history 195.

Figure 2:
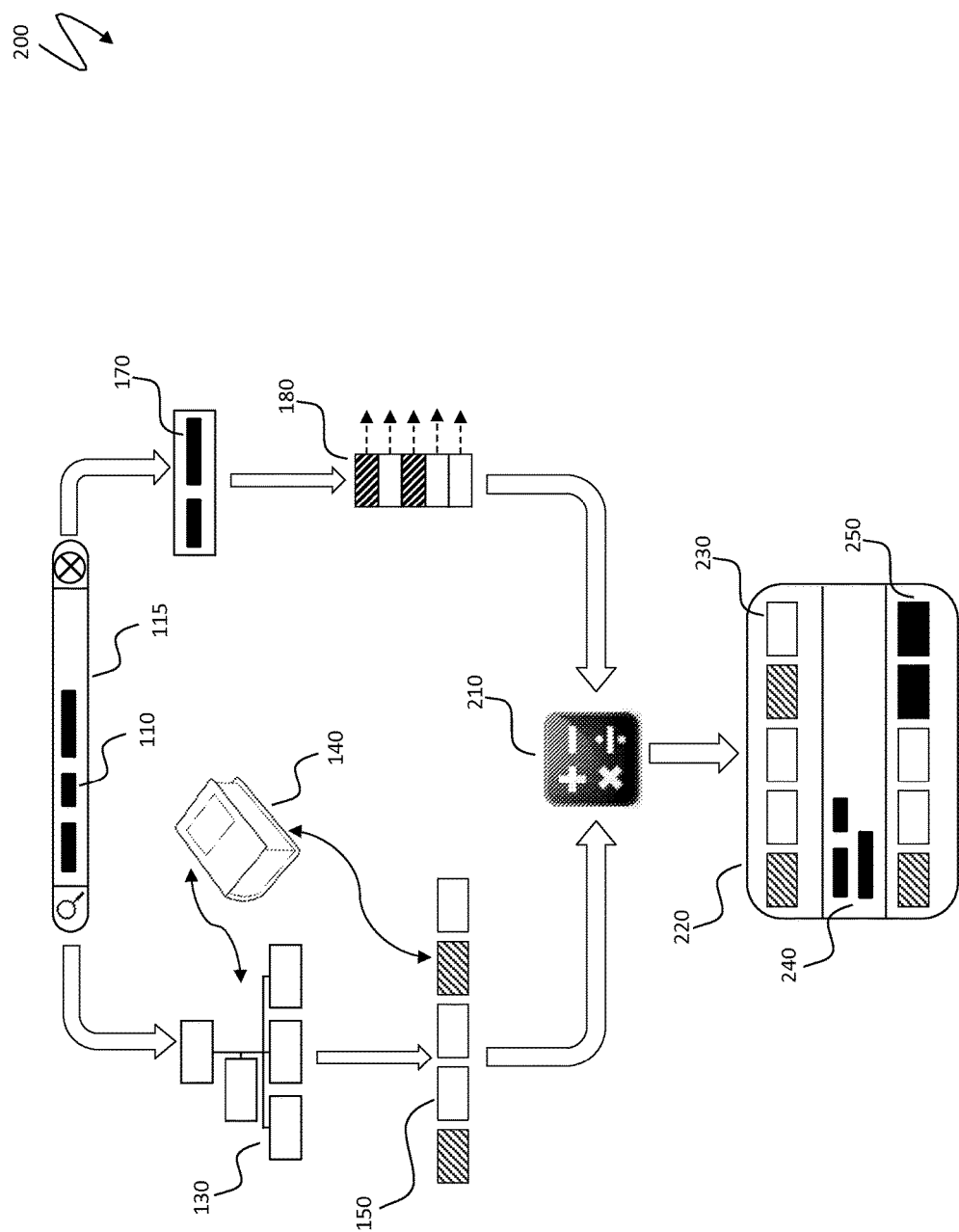
FIG. 2 is a schematic illustration of parallel evaluation of natural language and keyword queries and various suggestion lists, according to an embodiment of the system described herein.

FIG. 2 is a schematic illustration 200 of parallel evaluation of natural language and keyword queries and various suggestion lists. The partial search query 110 in the search field 115 is processed by two separate engines: a natural language query engine and a keyword suggestions engine. The parser 130 with the dictionary 140 completes the natural language query 150 and calculates a score of the natural language query 150 using a calculation module 210. In parallel, the natural language query 150 is cleaned by eliminating stop words and a refined set of terms illustrated in the item 170 is filtered through the reverse search index 180 to define data for tf/idf scoring, which is accomplished within the calculation module 210.

Depending on a set of alternatives and scores of the alternatives generated by each engine, an arbiter implemented within the calculation module 210 may choose different output options for displaying to a user in a suggestion list 220. The list 220 may include one or more natural language queries 230, keyword search suggestions 240 (which may complement one or more terms from the original query with other terms found in items of content collection side by side with the terms from the user query) or compound natural language and keyword search queries 250. The user may choose a suggestion that most closely corresponds to the search purpose of the user and find the corresponding items in the content collection.

Figure 3:
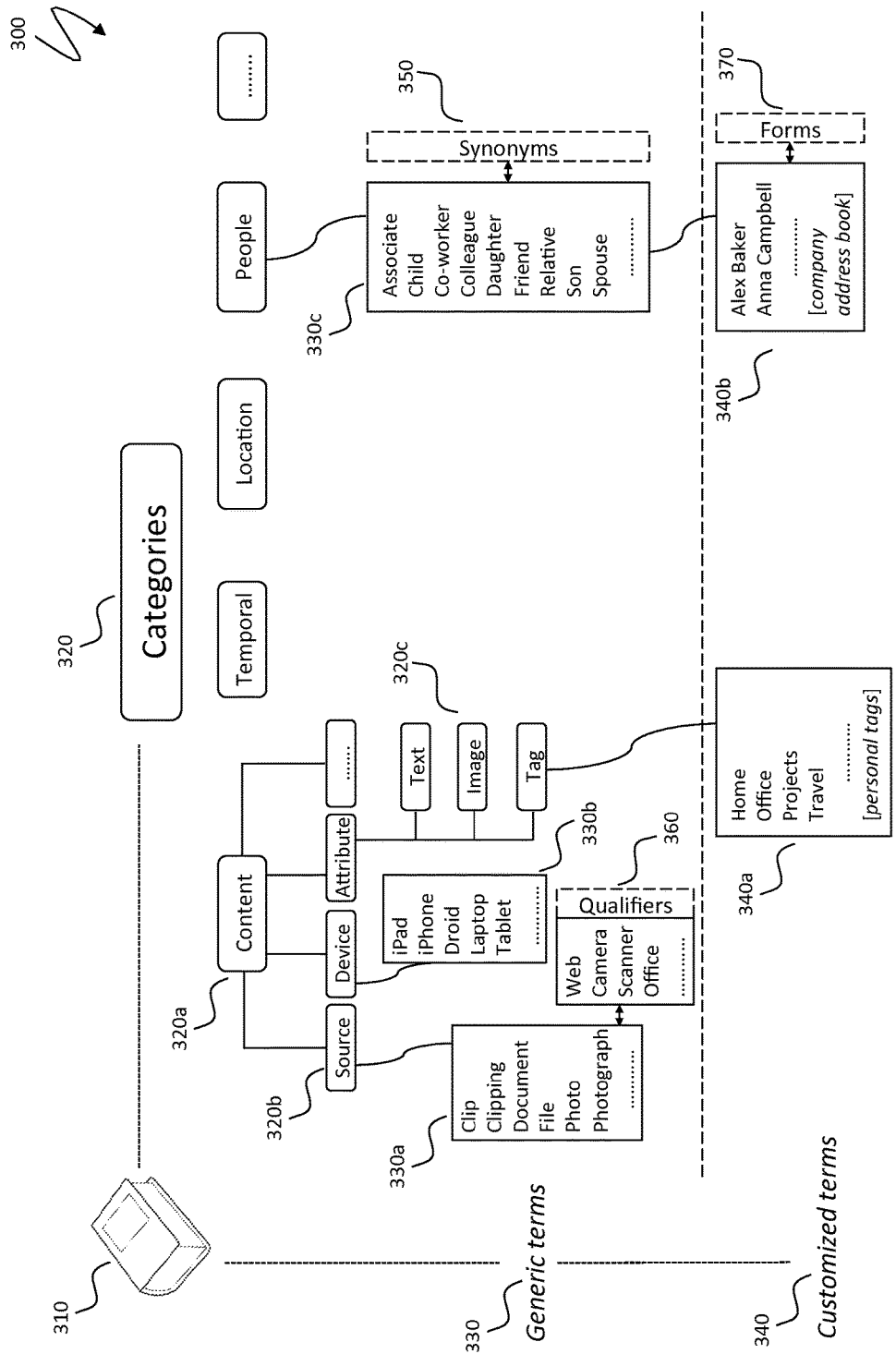
FIG. 3 is a schematic illustration of a system dictionary, according to an embodiment of the system described herein.

FIG. 3 is a schematic illustration 300 of a system dictionary 310 used by the natural language query engine. The system dictionary 310 may include lists of terms organized by categories 320 and split into generic terms 330 provided with the system and customized terms 340 extracted from user specific content collections. Dictionary categories may form a multi-level tree, as shown by items 320a (top level categories) and two sub-category levels 320b, 320c. Lists of generic terms 330a, 330b, 330c, associated with dictionary categories and supplied with the system based on analysis of certain types of content management systems and content collections form the core of the dictionary. For example, a list of generic terms 330a associated with a category "content source" may include terms clip, clipping, document, file, photo, etc. Generic terms may be supplemented with lists of customized search terms 340a, 340b extracted from individual or collective (for example, company-wide) content collections during the system deployment. For example, the list of customized terms 340a associated with a category "content attribute—tag" may include a set of personal tags assigned to items of a personal content collection, such as home, office, projects, travel, etc. Another example is a list of customized terms 340b associated with a category "people", which, in addition to a list of generic term 330c from the same category, may list all names from a company mail address book and search for items in a content collection that include personal names specific for a collection owner.

As explained elsewhere herein, lists of terms in a system dictionary may include synonyms 350 that may be grouped around core terms, as well as qualifiers 360 expanding a meaning of terms, and different acceptable forms 370 for the same terms, such as supplying full names with prefixes or shortening the names to surnames only.

FIGS. 4A-4F are schematic illustrations of search queries and results. FIG. 4A illustrates a user input in a search field containing two components (highlighted via different underline styles):

A content qualifier 410 office allows the system to expand a natural language query to a term office file(s), as explained elsewhere herein, including lists of terms 330a and 360 in FIG. 3.

A temporal term 415 this month, which may be interpreted by the natural language query mechanism, as explained elsewhere herein.

A resulting natural language query 417 is offered in the suggestion list and may correspond to custom user settings where office files are confined to Microsoft office files.

FIG. 4B illustrates a similar example where a temporal term 420 last year comes first and is followed by a term 425 clips defining a content source. A natural language query 427 reflects a system assumption or user settings where the content source type clips is associated with web clippings, that is, with portions of web pages copied into content items using, for example, special tools like Evernote Web Clipper.

In FIG. 4C, another two-component partial query contains an application name 430 penultimate (Penultimate is a handwriting input application from the Evernote family of products) and a content attribute 435 images. A natural language query 437 reflects a user search for notes created using Penultimate that have additional embedded images within handwritten notes.

FIG. 4D illustrates a combined suggestion list where both a natural language query and a set of keyword queries are present. A partial search query 440 droid may be associated with a device within the dictionary of a natural language query engine, as explained elsewhere herein, see, for example, FIG. 3 showing the term list 330b. Accordingly, a natural language query 447 Notes from an Android device may be included in the suggestion list. At the same time, the content of user notes may also include multiple occurrences of the term droid in various combinations. Accordingly, combinations 449 may be found in the reverse keyword search index (see the reverse keyword search index 180 in FIGS. 1, 2) and may obtain a sufficient score from the keyword suggestion engine to appear on the suggestion list. The user may choose a suggestion that better serves the search purpose and may find corresponding items in the content collection.

FIG. 4E illustrates a compound search query that includes both a natural language component and a keyword component. A three-component partial query starts with a note attribute 450 tagged which, according to a construction of the system dictionary and the production rules, instructs the engine to search within individual (or collective) tags in a content collection where the search is initiated, as illustrated by the term list 340a in FIG. 3. The second term 453 travel, entered by the user into the partial query, satisfies the dictionary entry (the tag travel is indeed present in the list of custom tags of a content collection), so a natural language query built on the basis of the first two terms 450, 453 has a high score. However, the next term 455 Hilton may not be a dictionary term, which leads the system, based on a high score of the previous natural language query, to assume that the term 455 may correspond to a keyword. This may be independently verified through the reverse keyword search index 180, and, if proven, the system may combine the natural language and the keyword part into a compound query 457, which may be displayed in the suggestion list.

FIG. 4F illustrates another compound search query with a temporal component 460 August and a keyword component 465 project X where detecting a keyword part of a compound query 467 is based on a user hint represented by enclosing the keyword part in double quotes "project X".

Figure 5:
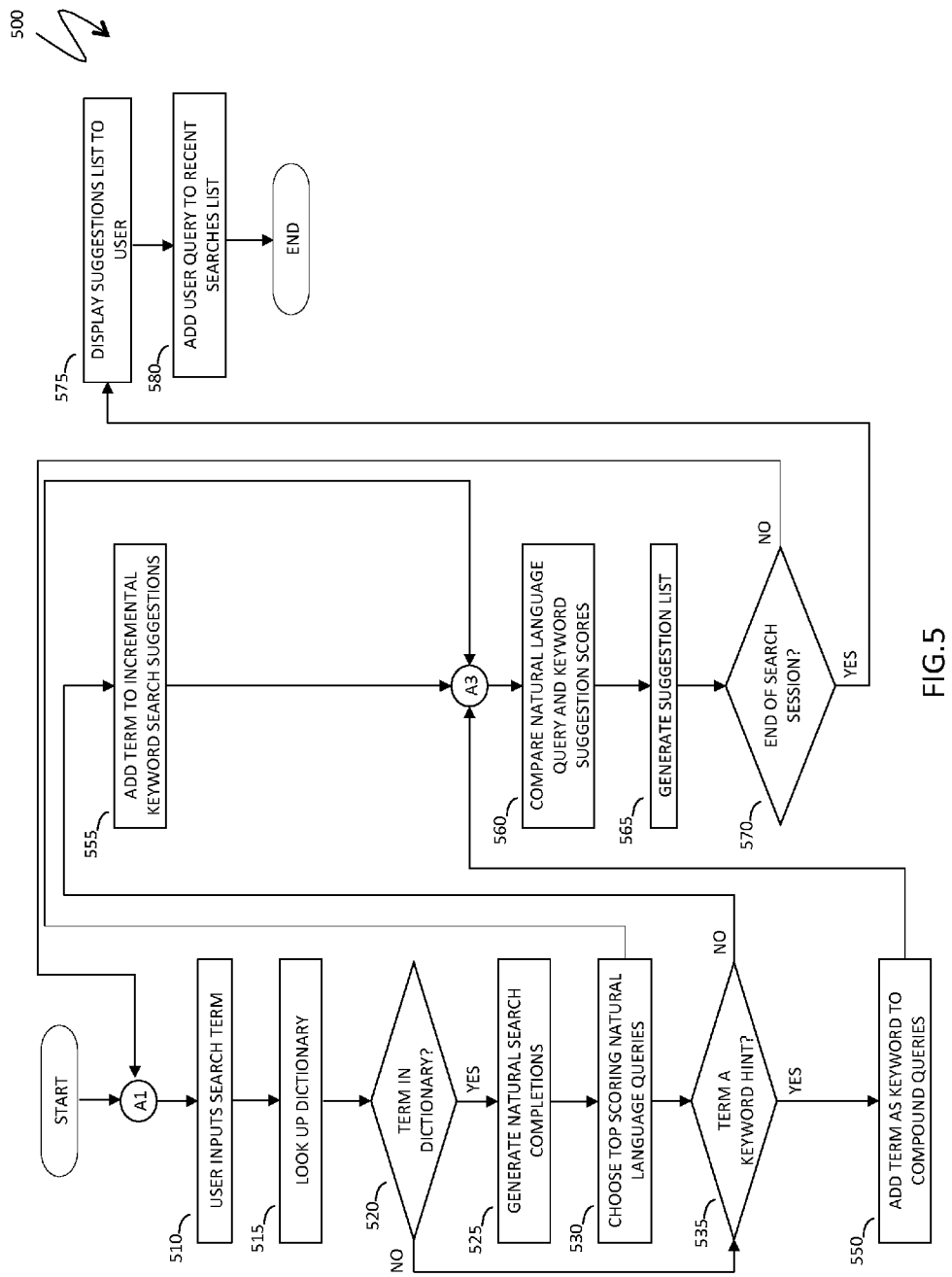
FIG. 5 is a system flow diagram illustrating system functioning, according to an embodiment of the system described herein.

Referring to FIG. 5, a flow diagram 500 illustrates processing performed in connection with system functioning. Processing starts at a step 510, where a user inputs an incremental search term. After the step 510, processing proceeds to a step 515, where the system looks up the context-free dictionary for the entered term to expand a natural language query, as explained elsewhere herein, see, for example, FIGS. 3 and 4 and the accompanying text. After the step 515, processing proceeds to a test step 520, where it is determined whether the term is in the dictionary. If so, processing proceeds to a step 525, where natural search completions to previous portions of a natural language query (or multiple queries) are generated based on the new dictionary term. After the step 525, processing proceeds to a step 530, where the natural language query engine recalculates scores of current completions and chooses top scoring natural language queries. After the step 530, processing proceeds to a step 560, discussed below.

If it is determined at a test step 520 that the currently entered term is not in the context-free dictionary, processing proceeds to a test step 535, where it is determined whether the current search term is a keyword hint (such as enclosed in quote signs or otherwise differentiated, as explained elsewhere herein). If so, processing proceeds to a step 550 where the term is added as a keyword to compound natural language and keyword queries. After the step 550, processing proceeds to the step 560, which may be independently reached from the step 530. If it is determined at a test step 545 that the keyword hint mark on the currently added search term is off, then processing proceeds to a step 555 where the current term is added to incremental keyword search queries. After the step 555, processing proceeds to the step 560, which may be independently reached from the steps 530, 550, as discussed above. At the step 560, the system compares scores obtained from the natural language query language from the step 530 and from the keyword suggestion engine, as explained elsewhere herein (see, for example, FIG. 2).

After the step 560, processing proceeds to a step 565, where a suggestion list is formed based on the score comparison at the step 560; the list may include one or multiple natural language queries, keyword search queries, compound queries or any combinations thereof. After the step 565, processing proceeds to a test step 570, where it is determined whether the end of a current search session has been reached. If not, processing proceeds back to the step 510, where the user may enter a next incremental search term. If the search session has ended, processing proceeds to a step 575, where the suggestion list is displayed to the user who may choose a needed query from the list and find corresponding items from the content collection. After the step 575, processing proceeds to a step 580, where the query chosen by the user at a previous step 575 is added to search history, i.e. a list of recent searches. After the step 580, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for displaying a set of candidate search queries, comprising:
   detecting a first input received at a search field of a user interface; and,
   in response to detecting the first input:
      processing, by a natural language query engine, the first input using a context-free dictionary of natural language to generate natural language query text from the first input;
      determining a natural language query score for each of one or more candidate queries that include the generated natural language query text;
      processing, by a keyword suggestions engine that is distinct from the natural language engine, the first input using a keyword search index that is distinct from the context-free dictionary of natural language terms to generate keyword query text from the first input;
      determining a keyword query score for each of one or more candidate queries that include the generated keyword query text;
      comparing a first score that corresponds to one or more natural language query scores with a second score that corresponds to one or more keyword query scores; and
      simultaneously displaying the set of candidate search queries in accordance with a determination, based on the comparison of the first score with the second score, of whether to display the generated natural language query text at the top of the set of candidate search queries or to display the generated keyword query text at the top of the set of candidate search queries, wherein the set of candidate search queries includes:
         a first candidate search query that includes only the natural language query text generated by the natural language query engine; and
         a second candidate search query that includes only the keyword query text generated by the keyword suggestions engine.

2. A method, according to claim 1, further comprising:
   determining, based on the one or more natural language scores and the one or more keyword query scores, a subset of the generated natural language query text and the generated keyword query text that have highest scores; and
   wherein the displayed set of candidate search queries is the subset of the generated natural language query text and the generated keyword query text.

3. A method, according to claim 1, wherein determining the one or more natural language query scores and determining the one or more keyword query scores includes scoring candidates that include the generated natural language query text and the generated keyword query text based at least partially on a non-monotonic document frequency function, wherein candidates that appear a first amount corresponding to a relatively frequent occurrence in a content database and candidates that appear a second amount corresponding to a relatively infrequent occurrence in the content database both score lower than candidates that appear in a content database with a frequency that is between the first amount and the second amount.

4. A method, according to claim 1, wherein the keyword search index includes terms from a content database provided by a note-taking software product.

5. A method, according to claim 1, including:
   detecting a second input at the search field of the user interface; and
   in accordance with a determination that the first input includes a first term in the context-free dictionary and the second input includes a second term in the context-free dictionary, generating second natural language query text using a phrase that includes the first term and the second term.

6. A method, according to claim 1, wherein the context-free dictionary includes at least one of: different categories of items, synonyms of terms, lists of synonymous names of external applications and associated data types, qualifiers and grammatical forms of terms, and customized terms.

7. A method, according to claim 6, wherein the different categories include types of items in a content collection, data attributes of items, data sources for items, hardware used to obtain, store and process data for items, and temporal characteristics of the items.

8. A method, according to claim 6, wherein customized terms include at least one of: generic terms for user locations, refined temporal terms, terms describing item size, and user specific content.

9. A method, according to claim 8, wherein the customized terms are provided by a content database of the user.

10. A method, according to claim 1, wherein the set of candidate search queries includes at least one compound search query that includes at least a portion of the natural language query text and at least a portion of the keyword query text.

11. A method, according to claim 1, wherein using the keyword search index to generate the keyword query text from the first input includes detecting, in the first input, a term that is not in the context-free dictionary.

12. A method, according to claim 1, wherein using the keyword search index to generate the keyword query text from the first input includes detecting, in the first input, hint text that includes at least one of:
   a preposition, or
   a set of quotation marks.

13. A system for displaying a set of candidate search queries, the system comprising:
   one or more processors;
   memory; and
   software, wherein the one or software is stored in the memory and is configured to be executed by the one or more processors, the software including instructions for:
      detecting a first input received at a search field of a user interface; and,
      in response to detecting the first input:
         processing, by a natural language query engine, the first input using a context-free dictionary of natural language to generate natural language query text from the first input;
         determining a natural language query score for each of one or more candidate queries that include the generated natural language query text;
         processing, by a keyword suggestions engine that is distinct from the natural language engine, the first input using a keyword search index that is distinct from the context-free dictionary of natural language terms to generate keyword query text from the first input;

determining a keyword query score for each of one or more candidate queries that include the generated keyword query text;

comparing a first score that corresponds to one or more natural language query scores with a second score that corresponds to one or more keyword query scores; and simultaneously displaying the set of candidate search queries in accordance with a determination, based on the comparison of the first score with the second score, of whether to display the generated natural language query text at the top of the set of candidate search queries or to display the generated keyword query text at the top of the set of candidate search queries, wherein the set of candidate search queries includes:

a first candidate search query that includes only the natural language query text generated by the natural language query engine; and a second candidate search query that includes only the keyword query text generated by the keyword suggestions engine.

14. The system of claim 13, wherein the set of candidate search queries includes at least one compound search query that includes at least a portion of the natural language query text and at least a portion of the keyword query text.

15. The system of claim 13, wherein using the keyword search index to generate the keyword query text from the first input includes detecting, in the first input, a term that is not in the context-free dictionary.

16. The system of claim 13, wherein using the keyword search index to generate the keyword query text from the first input includes detecting, in the first input, hint text that includes at least one of a preposition or a set of quotation marks.

17. The system of claim 13, wherein the software includes instructions for:

determining, based on the one or more natural language scores and the one or more keyword query scores, a subset of the generated natural language query text and the generated keyword query text that have highest scores; and wherein the displayed set of candidate search queries is the subset of the generated natural language query text and the generated keyword query text.

18. A non-transitory computer readable storage medium storing software for displaying a set of candidate search queries, the software comprising instructions, which when executed, causes a device to:

detect a first input received at a search field of a user interface; and, in response to detecting the first input:

process, by a natural language query engine, the first input using a context-free dictionary of natural language to generate natural language query text from the first input;

determine a natural language query score for each of one or more candidate queries that include the generated natural language query text;

process, by a keyword suggestions engine that is distinct from the natural language engine, the first input using a keyword search index that is distinct from the context-free dictionary of natural language terms to generate keyword query text from the first input;

determine a keyword query score for each of one or more candidate queries that include the generated keyword query text;

compare a first score that corresponds to one or more natural language query scores with a second score that corresponds to one or more keyword query scores; and simultaneously display the set of candidate search queries in accordance with a determination, based on the comparison of the first score with the second score, of whether to display the generated natural language query text at the top of the set of candidate search queries or to display the generated keyword query text at the top of the set of candidate search queries, wherein the set of candidate search queries includes:

a first candidate search query that includes only the natural language query text generated by the natural language query engine; and a second candidate search query that includes only the keyword query text generated by the keyword suggestions engine.

19. The non-transitory computer readable storage medium of claim 18, wherein the set of candidate search queries includes at least one compound search query that includes at least a portion of the natural language query text and at least a portion of the keyword query text.

20. The non-transitory computer readable storage medium of claim 18, wherein using the keyword search index to generate the keyword query text from the first input includes detecting, in the first input, a term that is not in the context-free dictionary.

21. The non-transitory computer readable storage medium of claim 18, wherein using the keyword search index to generate the keyword query text from the first input includes detecting, in the first input, hint text that includes at least one of a preposition or a set of quotation marks.

22. The non-transitory computer readable storage medium of claim 18, wherein the software includes instructions that cause the device to:

determine, based on the one or more natural language scores and the one or more keyword query scores, a subset of the generated natural language query text and the generated keyword query text that have highest scores; and wherein the displayed set of candidate search queries is the subset of the generated natural language query text and the generated keyword query text.

* * * * *

UNITED STATES PATENT AND TRADEMARK OFFICE
CERTIFICATE OF CORRECTION

PATENT NO. : 10,185,748 B1
APPLICATION NO. : 14/446474
DATED : January 22, 2019
INVENTOR(S) : Ayzenshtat et al.

Page 1 of 1

It is certified that error appears in the above-identified patent and that said Letters Patent is hereby corrected as shown below:

In the Claims

Claim 18, Column 13, Line 52, please delete "executed, causes" and insert --executed, cause--.

Signed and Sealed this
Second Day of April, 2019

Andrei Iancu
*Director of the United States Patent and Trademark Office*